US009460481B2

(12) United States Patent
Fonseca

(10) Patent No.: US 9,460,481 B2
(45) Date of Patent: Oct. 4, 2016

(54) SYSTEMS AND METHODS FOR PROCESSING DESKTOP GRAPHICS FOR REMOTE DISPLAY

(71) Applicant: VMware, Inc., Palo Alto, CA (US)

(72) Inventor: Jose Fonseca, London (GB)

(73) Assignee: VMware, Inc., Palo Alto, CA (US)

( * ) Notice: Subject to any disclaimer, the term of this patent is extended or adjusted under 35 U.S.C. 154(b) by 340 days.

(21) Appl. No.: 13/849,609

(22) Filed: Mar. 25, 2013

(65) Prior Publication Data
US 2014/0285497 A1    Sep. 25, 2014

(51) Int. Cl.
G06T 1/20    (2006.01)
G06F 3/14    (2006.01)

(52) U.S. Cl.
CPC .............. G06T 1/20 (2013.01); G06F 3/1462 (2013.01)

(58) Field of Classification Search
None
See application file for complete search history.

(56) References Cited

U.S. PATENT DOCUMENTS

| 7,015,909 | B1 * | 3/2006 | Morgan, III et al. | 345/426 |
| 8,520,734 | B1 * | 8/2013 | Xu | 375/240.16 |
| 2005/0190190 | A1 * | 9/2005 | Diard et al. | 345/502 |
| 2009/0067509 | A1 * | 3/2009 | Poon | 375/240.26 |
| 2010/0226441 | A1 * | 9/2010 | Tung | H04N 21/2343 375/240.24 |
| 2010/0271381 | A1 | 10/2010 | Byford et al. | |
| 2011/0141133 | A1 * | 6/2011 | Sankuratri et al. | 345/600 |
| 2011/0153957 | A1 * | 6/2011 | Gao | G06F 9/466 711/147 |
| 2012/0206461 | A1 * | 8/2012 | Wyatt | G09G 5/003 345/501 |

OTHER PUBLICATIONS

Parker, "Understanding Bandwidth and streaming media production", https://www.techsmith.com/index.html, Mar. 13, 2013.*
Nvidia VGX Boards, available at http://www.nvidia.co.uk/object/grid-vdi-graphics-cards-uk.html, last visited Mar. 12, 2013.

* cited by examiner

Primary Examiner — Kee M Tung
Assistant Examiner — Xin Sheng

(57) ABSTRACT

Systems and methods described herein facilitate processing or rendering desktop graphics for remote desktop display in, for example, a virtual desktop infrastructure (VDI), by decreasing the amount of data being transferred from a graphics processing unit (GPU). More specifically, the embodiments described herein include a host for hosting virtual machines within a VDI, the host includes a GPU that is configured to access a reference frame associated with desktop graphics. The GPU is further configured to generate a current frame associated with desktop graphics. The GPU is also configured to compare the reference frame with the current frame to identify one or more changed portions of the current frame relative to the reference frame, wherein the changed portions are used for the generation of an encoded frame that is configured to be displayed.

19 Claims, 4 Drawing Sheets

Reference Frame

Current Frame

Bitmap

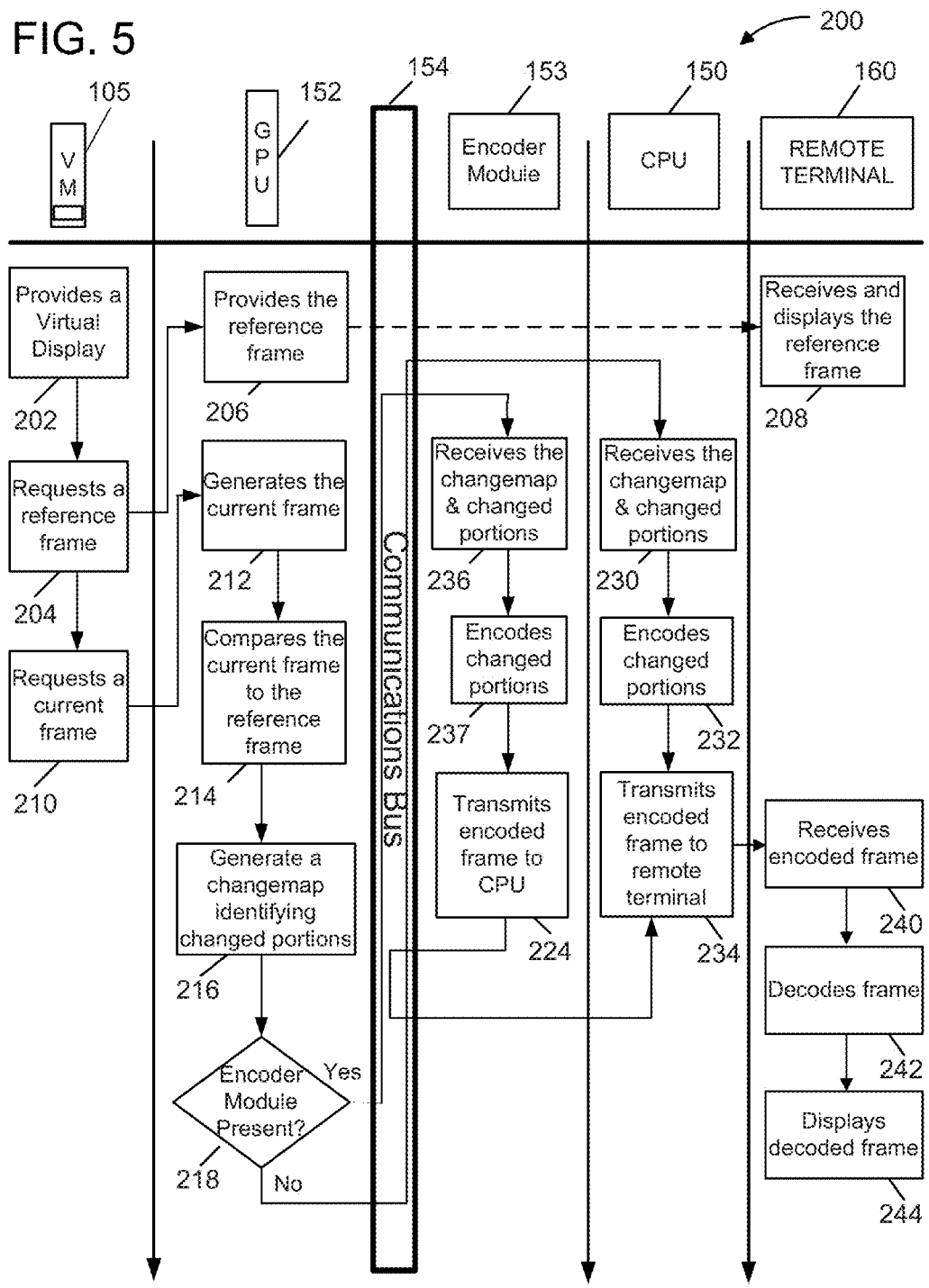

SYSTEMS AND METHODS FOR PROCESSING DESKTOP GRAPHICS FOR REMOTE DISPLAY

BACKGROUND

On modern 3D-enabled desktop environments, frames are often processed or rendered in a graphics processing unit (GPU) having dedicated video random access memory (VRAM). Processing desktop graphics with a GPU and VRAM facilitates offloading computational processes associated with desktop graphics processing from a computer system's central processing unit (CPU) and primary memory. Further, GPUs are commonly architected and tuned specifically for graphics processing, allowing them to render graphics more efficiently than the CPU.

GPUs traditionally display graphics to a display directly attached to the computer system. However, many systems use a server-based computing model, such as, for example, a virtual desktop infrastructure (VDI), which provides complete centrally-managed desktops to users using computer virtualization technology. In a typical VDI architecture, user displays and input devices are local, but applications execute remotely in a server. As such, a virtual desktop may be accessible by one or more remote users through a network. The virtual desktop may mimic a desktop computer interface or an interface of another computer or system by providing a virtual screen or virtual display to an end user. For example, in a VDI, the computer system supports multiple virtual machines (VMs) having virtual displays rather than displays physically attached to the computer system. In some known VDIs, the VMs may involve the GPU for rendering each successive frame of desktop graphics. Each frame is rendered by the GPU and transferred, in its entirety, from the GPU to the CPU across a peripheral control interconnect express (PCI-e) bus within the computer system. Such an approach consumes bandwidth on the bus. The CPU then compresses the desktop graphics frames before transferring the compressed frames to the remote client, wherein the desktop graphics will be uncompressed and displayed to a user.

In one version of the PCI-e standard, a 16 lane PCI-e bus yields a maximum throughput of approximately 8,192 megabytes (MBs) per second. A desktop at 1900 pixels× 1600 pixels refreshing at 30 frames per second (FPS) consumes approximately 348 MB per second. With these settings, a VDI having a single GPU is therefore limited by the PCI-e bus to hosting just 23 VMs. This hardware limitation thus presents a ceiling on the number of VMs that a VDI may support while harnessing the graphics processing benefits of a GPU.

SUMMARY

Systems and methods described herein facilitate processing or rendering desktop graphics for remote desktop display in, for example, a virtual desktop infrastructure (VDI), by decreasing the amount of data being transferred from a graphics processing unit (GPU). More specifically, the embodiments described herein include a host for hosting virtual machines within a VDI, the host includes a GPU that is configured to access a reference frame associated with desktop graphics. The GPU is further configured to generate a current frame associated with desktop graphics. The GPU is also configured to compare the reference frame with the current frame to identify one or more changed portions of the current frame relative to the reference frame, wherein the changed portions are used for the generation of an encoded frame that is configured to be displayed.

BRIEF DESCRIPTION OF THE DRAWINGS

FIG. 5 is a swimlane diagram of an exemplary method for processing the desktop graphics images shown in FIGS. 2 and 3 for display on the remote terminal.

DETAILED DESCRIPTION

Figure 1:
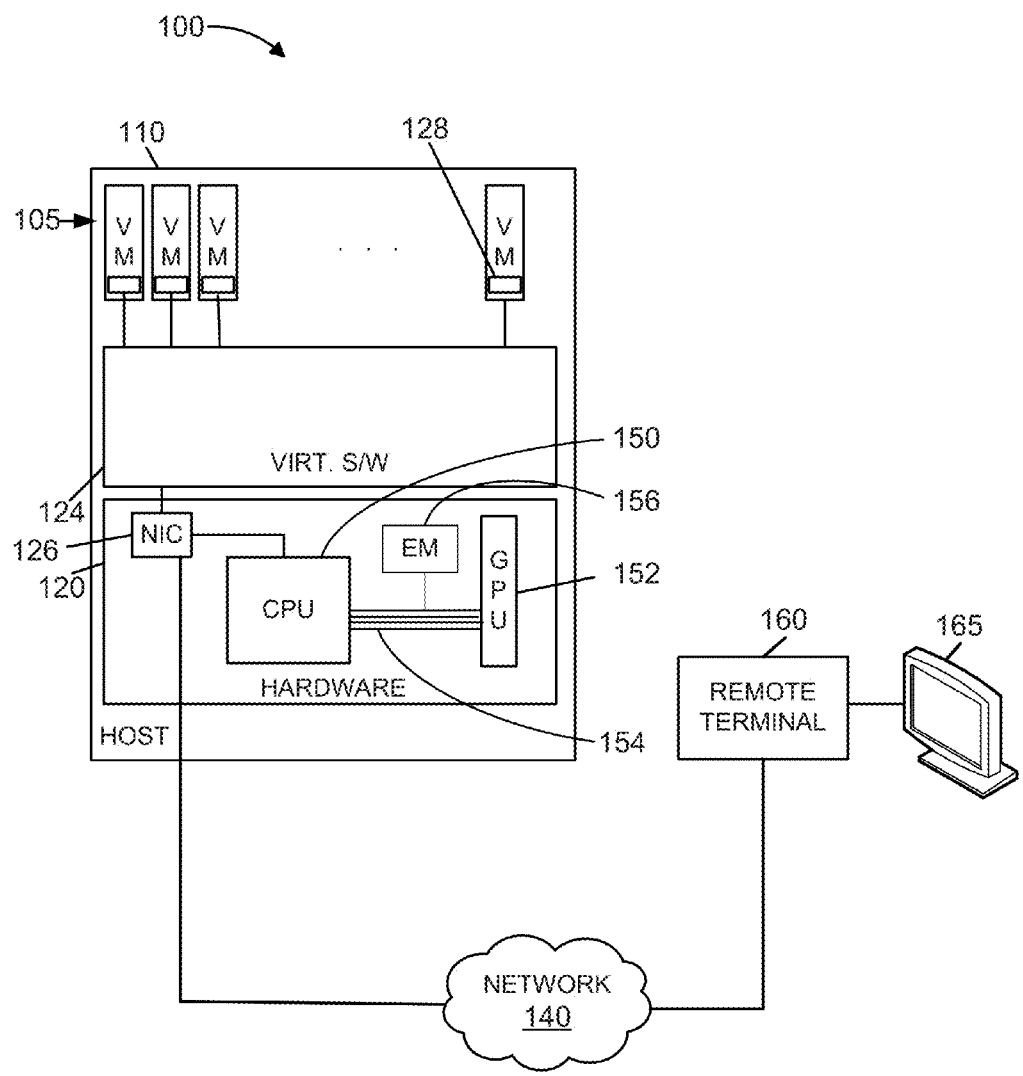
FIG. 1 is an exemplary virtual desktop infrastructure (VDI) having a host in communication with a remote terminal.

FIG. 1 shows an exemplary virtual desktop infrastructure (VDI) 100 having a plurality of virtual machines (VMs) 105 on a physical computer system or host 110. In the exemplary embodiment, host 110 includes hardware 120, a virtualization software, or manager, 124 running on hardware 120, and one or more VMs 105 executing on hardware 120 by way of virtualization software 124. The virtualization software 124 is therefore logically interposed between, and interfaces with, hardware 120 and VMs 105. Virtualization software 124 may be implemented directly in the hardware, e.g., as a system-on-a-chip, firmware, FPGA, etc.

In the exemplary embodiment, hardware 120 includes at least one processor or central processing unit (CPU) 150, wherein each CPU 150 is an execution unit, or "core," on a microprocessor chip. For example, in the exemplary embodiment, CPU 150 may be configured to transmit desktop graphics associated with VMs 105. Hardware 120 also includes a system memory (not shown), which is a general volatile random access memory (RAM), a network interface (NIC), and other devices. Hardware 120 also includes a graphics processing unit (GPU) 152 communicatively coupled to CPU 150 via a communications bus 154. In the exemplary embodiment, communications bus 154 is a peripheral control interconnect express (PCI-e) bus. Alternatively, any communications bus that enables operation of the systems and methods described herein may be used. Moreover, in the exemplary embodiment, GPU 152 is configured to render desktop graphics associated with VMs 105.

In the exemplary embodiment, host 110 may also include an encoder module 156. Encoder module 156 is communicatively coupled to both CPU 150 and GPU 152 via communications bus 154. Encoder module 156 may receive desktop graphics frames from GPU, encode the frames, and send the frames to CPU 150 for further processing.

Virtualization software 124 is sometimes referred to as a hypervisor, and includes software components for managing hardware resources and software components for virtualizing or emulating physical devices to provide virtual devices, such as virtual disks, virtual processors, virtual network interfaces, etc., for each VM 105. In the exemplary embodiment, each VM 105 is an abstraction of a physical computer system and may include an operating system (OS), such as Microsoft Windows® and applications, which are referred to as the "guest OS" and "guest applications," respectively, wherein the term "guest" indicates it is a software entity that resides within the VM. Microsoft Windows® is a registered trademark of the Microsoft Corporation of Redmond, Wash.

Each VM 105, in the exemplary embodiment, provides a virtual desktop 128 to a user of VMs 105. Each desktop 128 is an interactive user environment provided by the guest OS and applications running within VM 105, and generally includes one or more virtual screens or virtual displays (not shown), but may include other outputs, such as audio, indicator lamps, tactile feedback, etc. Each desktop 128 also accepts input from the user in the form of device inputs, such as keyboard and mouse inputs. Each desktop 128 may also accept simulated inputs, such as simulated keyboard and mouse inputs. In addition to user input/output, each desktop 128 may send and receive device data, such as input/output for a FLASH memory device local to the remote user, or to a local printer.

In the exemplary embodiment, the virtual displays may be presented to an end user on, for example, a remote terminal 160. More specifically, in the exemplary embodiment, an end user may connect to, and interact with, VM 105 using remote terminal 160, wherein remote terminal 160 is configured to display data, such as video data or desktop graphics, associated with the virtual displays of desktops 128. Remote terminal 160 communicates with host 110 via a network 140, which may be the Internet, a LAN, a WAN, or any combination thereof. Remote terminal 160 may be a desktop computer, laptop, mobile device, electronic tablet, thin client, or other similar device. Remote terminal 160 is capable of displaying the desktop graphics and graphical user interface (GUI) of applications running inside host 110 to an end user at remote terminal 160 using a computer display 165 or similar device. Remote terminal 160 may also be capable of receiving user input from the end user and transmitting the received user input to host 110.

Figure 2:
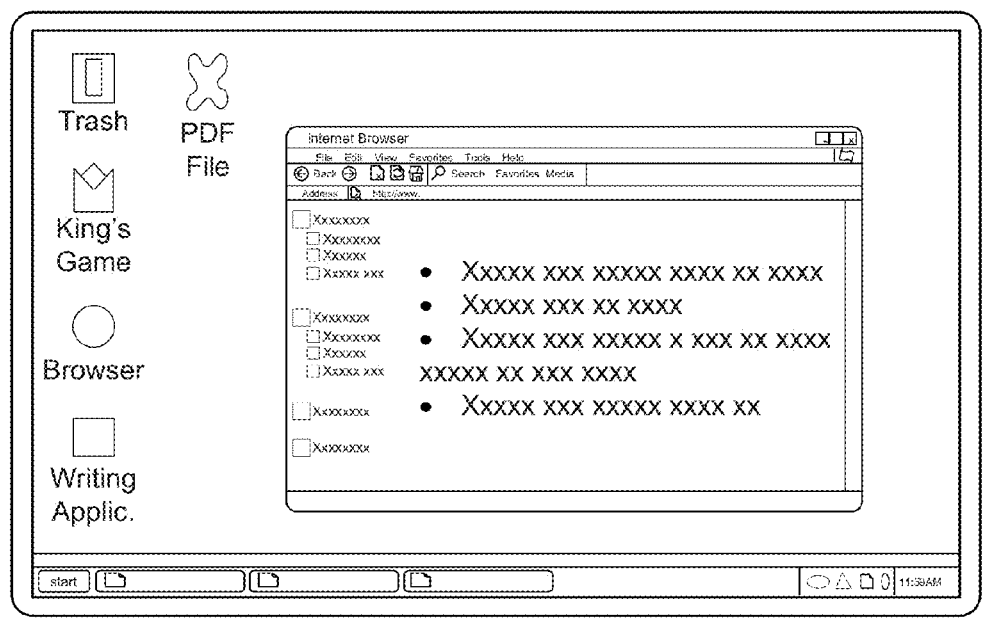
FIG. 2 is an exemplary desktop graphics image associated with the host and remote terminal shown in FIG. 1.

During operation of VDI 100, as explained in more detail below with respect to FIG. 5, host 110 facilitates processing desktop graphics data for remote desktop displays such that communications bandwidth utilization on communications bus 154 is efficient. For example, in the exemplary embodiment, VMs 105 provides the virtual displays for desktops 128 that are rendered or otherwise made available by GPU 152. The virtual displays include data, such as a desktop graphic image 190 (shown in FIG. 2). In the exemplary embodiment, image 190 represents a reference frame (i.e., a frame that will be used in an image comparison as the original image in the comparison). In image 190, a user of VM 105 sees a graphical user interface associated with desktop 128. Image 190 includes a window within desktop 128, which the user may move slightly, as represented by desktop graphic image 191.

Figure 3:
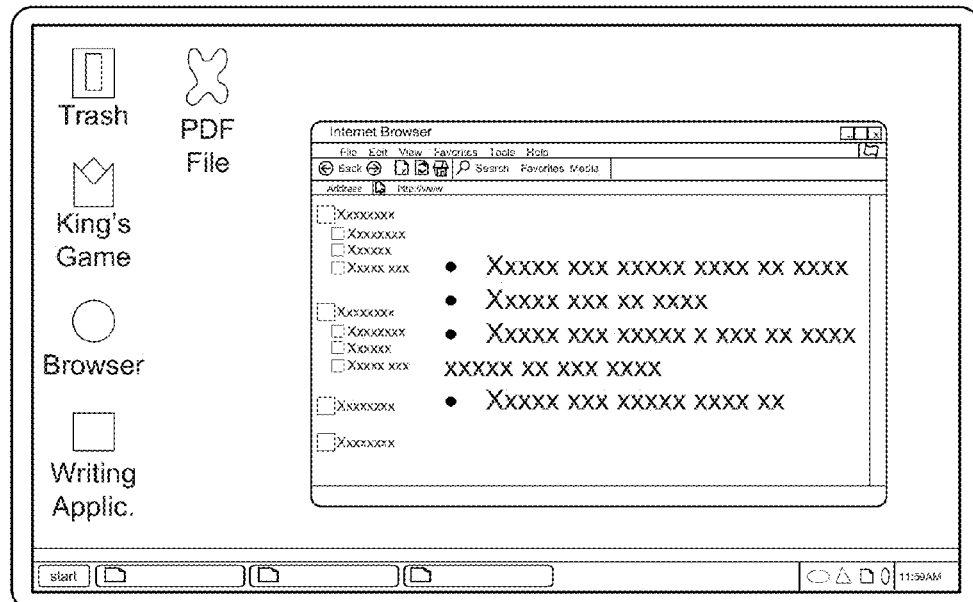
FIG. 3 is another exemplary desktop graphics image associated with the image shown in FIG. 1.
Figure 4:
FIG. 4 is an exemplary bitmap of a comparison of the image shown in FIG. 2 and the image shown in FIG. 3.

In the exemplary embodiment, image 190 is transferred from GPU 152 to CPU 150 and/or to encoder module 153 after rendering and/or processing by GPU 152. For example, in the exemplary embodiment, GPU 152 accesses image 190 for one of the desktops 128. GPU 152 also renders or generates a current or subsequent frame, such as a desktop graphic image 191 (shown in FIG. 3). GPU 152 then compares image 190 with image 191 to identify one or more changed portions of image 191 with respect to image 190. For example, in one embodiment, GPU 152 segments both images 190 and 191 substantially identically into tiles of a fixed size, such as 8 pixels by 8 pixels. Each tile of image 190 is then compared to its counterpart in image 191 to determine if any pixels in that tile have changed. A change map, or a bitmap, such as a bitmap 192 (shown in FIG. 4), is created, wherein bitmap 192 indicates each tile or portion that has changed. In the exemplary embodiment, bitmap 192 illustrates each portion of image 191 that has changed relative to image 190. Bitmap 192 includes a series of bits, wherein each bit represents one region of image 191. If the corresponding region of image 191 has changed as compared to the corresponding region of image 190, then that bit is set to "1". If there is no chance, then the bit is set to "0". Bitmap 192 is pictorially represented black for those regions that have changed and in white for the unchanged regions.

Once the changed portions have been identified, they can be transferred from GPU 152 across communications bus 164 and used for the generation of an encoded or compressed frame. For example, in one embodiment, GPU 152 transfers the changed portions of image 191 directly to CPU 150, and CPU 150 performs encoding of image 191. CPU 150 then transfers the encoded or compressed image 191 to remote terminal 160 for display on display 165. In another embodiment, rather than transferring the changed portion of image 191 to CPU 150, GPU 152 transfers the changed portions to encoder module 153. Encoder module 153 then performs encoding of image 191. The encoded or compressed image 191 is then transmitted from encoder module 153 to CPU 150. CPU 150 then transfers the encoded or compressed image 191 to remote terminal 160 for display on display 165.

Accordingly, rather than transferring each entire frame, such as image 191, from GPU 152 to CPU 150 and/or to encoder module 153 via communications bus 154, only the changed portions of the frame are transferred. More specifically, once GPU 152 identifies the changed portions in the current frame with respect to the previous frame, then GPU 152 only transmits these changed portions to CPU 150 and/or to encoder module 153 via communications bus 154. Therefore, bandwidth utilization on communications bus 154 does not substantially increase.

FIG. 5 is a swimlane diagram 200 of an exemplary method for processing the desktop graphics, such as images 190 and 191 (shown in FIGS. 2 and 3, respectively) for display on remote terminal 160. This method may be embodied within a plurality of computer-executable instructions stored in one or more memories, such as one or more computer-readable storage mediums. Computer storage mediums may include non-transitory storage medium such as volatile and nonvolatile random access memory, removable and non-removable mediums implemented in any method or technology for storage of information such as computer-readable instructions, data structures, program modules or other data. The instructions may be executed by one or more processors to perform the functions described herein.

In operation 202, a VM, such as VM 105, provides a virtual display for desktop 128 (shown in FIG. 1), that is rendered or otherwise made available by a GPU, such as GPU 152, wherein the virtual displays include data, such as desktop graphics data. More specifically, in one embodiment, VM 105 requests a reference frame, such as image 190, from GPU 152 in operation 204. GPU 152 provides the reference frame to a remote terminal 160 in operation 206. The reference frame is then received and displayed by remote terminal 160 in operation 208.

Next, in operation 210, VM 105 requests a current frame, such as image 191. The request for the current frame may result in portions that will have changed based on, for example, user activity on desktop 128. The user activity on desktop 128 may include, for example, mouse movement or the moving of a window on desktop 128. In operation 212, GPU 152 generates image 191. However, rather than transmitting all portions of image 191 to remote terminal 160 for display, GPU 152 only transmits some portions of image 191. More specifically, in operation 214, GPU 152 compares image 190 with image 191 to identify one or more changed portions of image 191 relative to image 190. In one embodiment, when GPU 152 compares image 191 with image 190, each frame is divided into regions or portions, such as tiles. For example, image 190 is divided into tiles that are of equal size and image 191 is divided into substantially similar tiles that are of equal size. Each tile size may have the same dimensions, wherein the dimensions may range from between 8 pixels by 8 pixels and 128 pixels by 128 pixels. In one embodiment, each tile size may be 8 pixels by 8 pixels. In another embodiment, the tile size may be 128 pixels by 128 pixels. Then GPU 152 compares each tile from image 190 with an analogous tile of image 191.

Upon identifying the changed portions within image 191 with respect to image 190, GPU 152 then generates a change map of the identified changed portions in operation 216. For example, in one embodiment, GPU 152 generates a bitmap, such as bitmap 192 (shown in FIG. 4). Bitmap 192 describes which tiles of image 191 have changed with respect to image 190. For example, bitmap 192 includes a bit for each tile of image 191, wherein a bit value of 1 indicates that the corresponding tile has changed between image 190 and image 191, and a bit value of 0 indicates that the tile has not changed with respect to the corresponding tile in image 190.

In the exemplary embodiment, GPU 152 transmits only the changed portion(s) and the generated change map across communications bus 154 to CPU 152 or to encoder module 153. More specifically, in operation 218, GPU determines whether encoder module 153 is present within host 110 (shown in FIG. 1). If encoder module 153 is not present, then GPU, then GPU 152 transmits the change map and the changed tile(s) across communications bus 154 to CPU. In operation 230, CPU 150 receives the changed portions and the change map. In operation 232, CPU 150 encodes or compresses the changed portions to generate an encoded or compressed frame of image 191. CPU 150 then transmits the encoded frame of image 191 to remote terminal 160 in operation 234.

If encoder module 153 is present, then GPU 152 may, instead, decide to transmit the change map and the changed portions to encoder module 153. In operation 236, encoder module 153 receives the change map and the changed portions. In operation 237, encoder module 153 encodes or compresses the changed portions to generate an encoded or compressed frame of image 191. Encoder module 153 then transmits the encoded frame to CPU 150 in operation 238, and CPU transmits the encoded frame to remote terminal 160 pursuant to operation 212.

Remote terminal 160, in operation 240, receives the encoded frame. In operation 242, remote terminal 160 decodes the encoded frame. For example, the encoded frame includes only the changed tiles, as well as the change map which defines the positioning of each changed tile. The first changed tile may be rendered in the first "1" tile position, as indicated by the change map. The next changed tile may be rendered in the next "1" tile position. This process continues until each changed tile has been displayed on remote terminal 160. In operation 244, remote terminal 160 displays the decoded frame on display 165 (shown in FIG. 1) for a user.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A host hosting a virtual machine within a virtual desktop infrastructure, the host comprising:
   a central processing unit (CPU);
   a communications bus; and
   a graphics processing unit (GPU) coupled to said CPU by the communications bus, said GPU configured to:
      access a reference frame associated with desktop graphics;
      generate a current frame associated with desktop graphics;
      compare the reference frame with the current frame to identify one or more changed portions of the current frame relative to the reference frame;
      generate a bitmap, wherein the bitmap includes a series of bits with each bit representing a portion of the current frame, bits set to a first value identifying which portions of the current frame have changed in comparison to the reference frame and bits set to a second value identifying which portions of the current frame have not changed in comparison to the reference frame; and
      send, over said communications bus, the bitmap and the one or more changed portions of the current frame, while excluding unchanged portions of the current frame, to said CPU, wherein the bitmap and the one or more changed portions are encoded to generate an encoded frame and the encoded frame is transmitted to a remote terminal to be displayed.

2. The host of claim 1, wherein said CPU is configured to:
   receive the one or more changed portions from said GPU;
   encode the one or more changed portions to generate the encoded frame; and
   transmit the encoded frame to a remote terminal for display on a remote display.

3. The host of claim 2, wherein the communications bus includes one of a Peripheral Component Interconnect (PCI) bus or a PCI Express bus.

4. The host of claim 1, wherein said host further comprises an encoder module in communication with said GPU and said CPU via the communications bus, and wherein sending, by said communications bus, the one or more changed portions of the current frame to said CPU comprises:
   receiving, by said encoder module, the one or more changed portions from said GPU;
   encoding, by said encoder module, the one or more changed portions to generate the encoded frame; and
   sending, by said encoder module, the encoded frame to said CPU for transmission to the remote terminal, the encoded frame including the one or more changed portions.

5. The host of claim 1, wherein said virtual machine comprises a guest operating system, wherein each of the reference frame and the current frame are associated with desktop graphics of said guest operating system.

6. The host of claim 1, wherein said GPU is configured to compare the reference frame with the current frame by using a GPU shader function.

7. The host of claim 1, wherein each of the one or more changed portions includes a square tile of the current frame having a dimension of between 8 pixels by 8 pixels and 128 pixels by 128 pixels.

8. A method of processing video data for a remote display, the method comprising:
   accessing a reference frame associated with desktop graphics via a graphics processing unit (GPU);
   generating a current frame associated with desktop graphics via the GPU;
   comparing the reference frame with the current frame, via the GPU, to identify one or more changed portions of the current frame relative to the reference frame;
   generating a bitmap, wherein the bitmap includes a series of bits with each bit representing a portion of the current frame, bits set to a first value identifying which portions of the current frame have changed in comparison to the reference frame and bits set to a second value identifying which portions of the current frame have not changed in comparison to the reference frame; and
   transmitting, over a communications bus, the bitmap and the one or more changed portions of the current frame, while excluding unchanged portions of the current frame, to a central processing unit (CPU), wherein the bitmap and the one or more changed portions are encoded to generate an encoded frame and the encoded frame is transmitted to a remote terminal to be displayed.

9. The method of claim 8, further comprising:
   encoding the one or more changed portions, via the CPU, to generate the encoded frame; and
   transmitting the encoded frame, via the CPU, to a remote terminal for display on the remote display.

10. The method of claim 9 wherein the communications bus is one of a Peripheral Component Interconnect (PCI) bus or a PCI Express bus.

11. The method of claim 8, wherein transmitting, over the communications bus, the one or more changed portions of the current frame to the CPU comprises:
   transmitting the one or more changed portions from the GPU to an encoder module that is communication with the GPU via the communications bus;
   encoding the one or more changed portions, via the encoder module, to generate the encoded frame; and
   transmitting the encoded frame, via the encoder module, to the CPU, the encoded frame including the one or more changed portions.

12. The method of claim 11, further comprising transmitting the encoded frame, via the CPU, to a remote terminal for display on the remote display.

13. The method of claim 8, further comprising transmitting each of the reference frame and the current frame from a virtual machine to the GPU, wherein the virtual machine includes a guest operating system, the reference frame and the current frame are each associated with desktop graphics of the guest operating system.

14. The method of claim 8, wherein comparing the reference frame with the current frame, via the GPU, further comprises comparing the reference frame with the current frame, via the GPU, by using a GPU shader function.

15. The method of claim 8, wherein each of the one or more changed portions includes a square tile of the current frame having a dimension of between 8 pixels by 8 pixels and 128 pixels by 128 pixels.

16. At least one non-transitory computer-readable storage medium having computer-executable instructions embodied thereon, wherein, when executed by at least one processor within a graphics processing unit (GPU), the computer-executable instructions cause the at least one processor to:
- access a reference frame associated with desktop;
- generate a current frame associated with desktop graphics;
- compare the reference frame with the current frame to identify one or more changed portions of the current frame relative to the reference frame;
- generate a bitmap, wherein the bitmap includes a series of bits with each bit representing a portion of the current frame, bits set to a first value identifying which portions of the current frame have changed in comparison to the reference frame and bits set to a second value identifying which portions of the current frame have not changed in comparison to the reference frame; and
- send, over a communications bus, the bitmap and the one or more changed portions of the current frame, while excluding unchanged portions of the current frame, to a central processing unit (CPU), wherein the bitmap and the one or more changed portions are encoded to generate an encoded frame and the encoded frame is transmitted to a remote terminal to be displayed.

17. The at least one non-transitory computer-readable storage medium of claim 16, wherein the computer-executable instructions further cause at least one processor within the CPU to;
- receive the one or more changed portions from the GPU via the communications bus;
- encode the one or more changed portions to generate the encoded frame; and
- transmit the encoded frame to a remote terminal for display on a remote display.

18. The at least one non-transitory computer-readable storage medium of claim 16, wherein sending the one or more changed portions of the current frame to the CPU comprises sending the one or more changed portions to an encoder module via the communications bus, and wherein the computer-executable instructions further cause at least one processor associated with an encoder module to:
- encode the one or more changed portions to generate the encoded frame; and
- transmit the encoded frame to the CPU for transmission to a remote terminal.

19. The at least one non-transitory computer-readable storage medium if claim 16, wherein the computer-executable instructions further cause the at least one processor to compare the reference frame with the current frame by using a GPU shader function.

* * * * *